United States Patent
Leung

(10) Patent No.: US 10,251,236 B1
(45) Date of Patent: Apr. 2, 2019

(54) LAMPS HAVING CURRENT LEAKAGE PROTECTION, SYSTEMS AND METHODS OF USE

(71) Applicant: Huizhou Light Engine Limited, Huizhou (CN)

(72) Inventor: Wa Hing Leung, Tin Shui Wai (HK)

(73) Assignee: Huizhou Light Engine Limited, Huizhou, Guangdong (CN)

( * ) Notice: Subject to any disclaimer, the term of this patent is extended or adjusted under 35 U.S.C. 154(b) by 0 days.

(21) Appl. No.: 16/005,391

(22) Filed: Jun. 11, 2018

(51) Int. Cl.
| | | |
|---|---|---|
| *F21V 15/00* | (2015.01) | |
| *F21V 25/00* | (2006.01) | |
| *H05B 33/08* | (2006.01) | |
| *F21V 19/00* | (2006.01) | |
| *F21V 23/00* | (2015.01) | |
| *F21V 31/00* | (2006.01) | |
| *F21Y 115/10* | (2016.01) | |

(52) U.S. Cl.
CPC ......... *H05B 33/089* (2013.01); *F21V 19/003* (2013.01); *F21V 23/009* (2013.01); *F21V 31/00* (2013.01); *F21Y 2115/10* (2016.08)

(58) Field of Classification Search
CPC .......... F21V 3/063; F21V 15/00; F21V 29/30; F21V 31/00; F21V 19/003; F21V 23/009; F21W 2131/401; F21Y 2115/10
See application file for complete search history.

(56) References Cited

FOREIGN PATENT DOCUMENTS

CN 207094305 U * 3/2018

* cited by examiner

*Primary Examiner* — Tung X Le
*Assistant Examiner* — Henry Luong
(74) *Attorney, Agent, or Firm* — Duane Morris LLP

(57) ABSTRACT

An LED lamp is configured to be connected to a leakage protection switch. The LED lamp includes one or more light emitting diodes, a control circuit, a light board and an enclosure. The control circuit is configured to be coupled to the leakage protection switch by a hot connector and a neutral connector. The light board is a printed circuit board that includes a track that surrounds a light module. A branch of the hot connector is directly coupled to the track and the light module is coupled to the control circuit by a hot line and a neutral line. The enclosure supports the control circuit and the light board. When water contacts the track, at least a portion of a current flowing through the hot connector enters a ground conductor, thereby causing the leakage protection switch to electrically disconnect the LED lamp from a power supply.

21 Claims, 5 Drawing Sheets

LAMPS HAVING CURRENT LEAKAGE PROTECTION, SYSTEMS AND METHODS OF USE

This application relates to lighting systems and, in particular, to lighting systems intended to be used in a body of water (e.g., pool) and other environments where the light is potentially exposed to water.

BACKGROUND

Lamps, typically with incandescent bulbs, halogen or light-emitting diodes (LED), are often installed in a body of water, such as a pool or a hot tub, to illuminate the water to allow for nighttime use or to provide a desired aesthetic appearance of the body of water. However, these lamps create a risk of electrocuting individuals and/or animals that are touching, using or in the body of water when water penetrates the light enclosure and enters the interior of the lamp. In order to prevent injury or death to those touching, using or in the water, various safety mechanisms can be used to reduce the risk of electrocution. However, such safety mechanisms can require additional components in the lamp that would increase the size, weight and/or manufacturing cost of the lamp, or are located external to the lamp, such as an external panelboard, switchboard or controller. Thus, there is a need for a lamp with at least one or more safety mechanisms and systems and methods thereof to overcome the above-mentioned problems while providing a more cost-efficient, compact solution that minimizes additional cost and the amount of additional components to or with the lamp.

SUMMARY

The exemplary embodiments disclosed herein are directed to solving the issues relating to one or more of the problems present in the prior art, as well as providing additional features that will become readily apparent by reference to the following detail description when taken in conjunction with the accompanying drawings. It is understood, however, that these embodiments are presented by way of example and are not limiting. Further, it will be apparent to those of ordinary skill in the art who read the present disclosure that various modifications to the disclosed exemplary embodiments can be made while remaining within the scope of the present disclosure.

In one aspect, an LED lamp is configured to be connected to a leakage protection switch. The LED lamp includes one or more light emitting diodes, a control circuit, a light board and an enclosure. The control circuit is configured to be coupled to the leakage protection switch by a hot connector and a neutral connector. The light board is a printed circuit board that includes a track that surrounds at least a portion of a light module on the printed circuit board. A branch of the hot connector is directly coupled to the track and the light module is coupled to the control circuit by a hot line and a neutral line. The enclosure supports the control circuit and the light board. When water contacts at least a portion of the track, at least a portion of a current flowing through the hot connector enters a ground conductor, thereby causing the leakage protection switch to electrically disconnect the LED lamp from a power supply.

In a further aspect, the track is adjacent to at least a portion of a perimeter of the printed circuit board. In a further aspect, the track extends adjacent the entire perimeter of the printed circuit board. In a further aspect, the track is exposed along substantially its entire length. In a further aspect, the LED lamp also includes a fuse connected to the hot connector. In a further aspect, the LED lamp is configured to be installed in or near a pool or other body of water.

In another aspect, a lighting system is configured to be powered by a power supply. The lighting system includes a leakage protection switch, a plurality of LED lamps, a plurality of housings, and a ground conductor. The leakage protection switch is coupled to the power supply. Each of the LED lamps include one or more light emitting diodes, a control circuit, a light board, and an enclosure. The control circuit is configured to be coupled to the leakage protection switch by a hot connector and a neutral connector. The light board is a printed circuit board that includes a track that surrounds at least a portion of a light module on the printed circuit board. A branch of the hot connector is directly coupled to the track and the light module is coupled to the control circuit by a hot line and a neutral line. The enclosure supports the one or more light emitting diodes, the light board, and the control circuit. Each of the plurality of LED lamps is disposed in one of the plurality of housings such that the LED lamp is connected to a socket in the housing. The ground conductor is coupled to each of the plurality of housings. When water contacts the track of one of the plurality of LED lamps, at least a portion of a current flowing through the hot connector enters the ground conductor, thereby causing the leakage protection switch to electrically disconnect at least one of the plurality of LED lamps from the power supply.

In a further aspect, wherein the track is adjacent to at least a portion of a perimeter of the printed circuit board of each of the LED lamps. In a further aspect, wherein the track extends adjacent the entire perimeter of the printed circuit board. In a further aspect, wherein the track is exposed along substantially its entire length. In a further aspect, wherein each of the LED lamps also includes a fuse connected to the hot connector. In a further aspect, wherein each of the plurality of LED lamps is configured to be installed in or near a pool or other body of water. In a further aspect, wherein the leakage protection switch electrically disconnects the plurality of LED lamps from the power supply.

In another aspect, a current leakage protection circuit is configured to be connected to a power supply. The current leakage protection switch includes a leakage protection switch, a lamp, and a ground conductor. The lamp includes a control circuit, a light board, and an enclosure. The control circuit is coupled to the leakage protection switch by a hot connector and a neutral connector. The light board is coupled to the control circuit by a hot line and a neutral line and is directly coupled to the leakage protection switch by a branch of the hot connector. The enclosure supports the control circuit and the light board. The lamp is disposed in a housing such that the lamp is connected to a socket in the housing. The ground conductor is coupled to the housing. When water contacts the light board, at least a portion of a current flowing through the hot connector enters the ground conductor, thereby causing the leakage protection switch to electrically disconnect the lamp from the power supply.

In a further aspect, the current leakage protection circuit also includes a fuse connected to the hot connector. In a further aspect, wherein the lamp includes one or more light emitting diodes. In a further aspect, wherein the lamp is configured to be installed in or near a pool or other body of water. In a further aspect, wherein the light board is a printed circuit board that includes a track that surrounds at least a portion of a light module on the printed circuit board, the branch of the hot connector is directly coupled to the track and the hot line and the neutral line are coupled to the light module. In a further aspect, wherein the track is exposed along substantially its entire length.

In another aspect, a method of controlling electricity flow to an LED lamp is provided. The method includes providing a current leakage protection circuit. The current leakage protection circuit includes a leakage protection switch, the LED lamp, and a ground conductor. The lamp includes a control circuit, a light board, and an enclosure. The control circuit is coupled to the leakage protection switch by a hot connector and a neutral connector. The light board is coupled to the control circuit by a hot line and a neutral line and is directly coupled to the leakage protection switch by a branch of the hot connector. The enclosure supports the control circuit and the light board. The lamp is disposed in a housing such that the lamp is connected to a socket in the housing. The ground conductor is coupled to the housing. The method further includes powering the LED lamp using a power supply having a hot conductor and a neutral conductor each coupled to the leakage protection switch. The method further includes electrically disconnecting the LED lamp from the power supply by contacting water to at least a portion of the light board and allowing at least a portion of a current flowing through the hot connector to enter the ground conductor.

In a further aspect, the method of controlling electricity also includes triggering the leakage protection switch to electrically disconnect the LED lamp from the power supply.

BRIEF DESCRIPTION OF THE DRAWINGS

The features of the embodiments described herein will be more fully disclosed in the following detailed description, which is to be considered together with the accompanying drawings wherein like numbers refer to like parts and further wherein.

DETAILED DESCRIPTION

Figure 1:
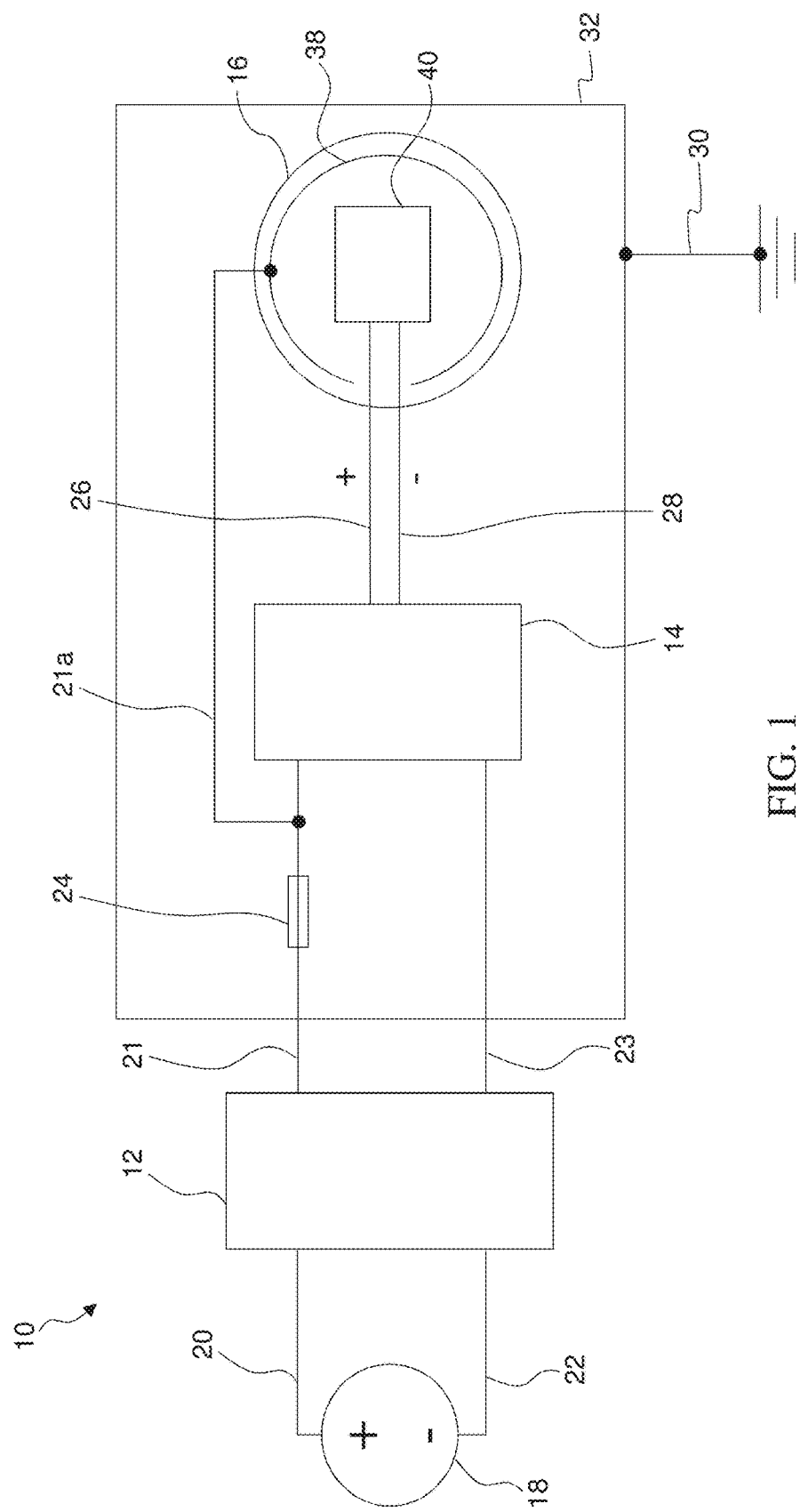
FIG. 1 is a diagram of a leakage protection circuit, according to one embodiment.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The present disclosure describes a LED lamp with a leakage protection circuit that can be used in underwater lighting systems, such as lamps installed in a body of water, which includes, without limitation, naturally or artificially-created, pools, hot tubs, harbors, ponds, lakes, creeks, rivers, reservoirs, flood control impoundments and channels, drainage ditches, livestock tanks, and other bodies of water for decorative, agricultural, municipal, and/or industrial use. Such an LED lamp can also be used on buildings, vehicles, including but not limited to amphibious vehicles (e.g., cars, buses, trucks, military vehicles, boats, hovercraft, amphibious bicycles, submarines, ships), or any other vehicle or environment where a lamp is exposed to water. The lamps and circuits described herein quickly and automatically interrupt power supplied to the lamp upon entry of water into an enclosure surrounding the lamp. The circuit described herein is particularly well suited for use with LED based lights, but can be used with any appropriate light.

As can be seen in FIG. 1, a leakage protection circuit 10 includes a leakage protection switch 12, a control circuit 14, and a light board 16. The leakage protection switch 12 is coupled to a power supply 18 via a hot conductor 20 and a neutral conductor 22. The leakage protection circuit 10 can also include various other electrical components, such as resistors, capacitors, switches, or any other appropriate or desired components. The various components of the leakage protection circuit 10 can be connected through any appropriate means, including soldering, various mechanical connectors, or any other appropriate technique.

The leakage protection switch 12 can also be referred to as a residual-current device, residual-current circuit breaker, ground fault circuit interrupter, a ground fault interrupter, an appliance leakage current interrupter, a safety switch or any apparatus that monitors and determines if there is a difference (or current leak) between current going to a load and current coming from the load, and turns the circuit off (or interrupts) when there is a difference (or current leak). The difference can be, for example, approximately 4 to 6 milliamps; 4 to 6 milliamps; or any number within the 4 to 6 milliamps range. When the difference between the current flowing through the hot conductor 20 and the current flowing through the neutral conductor 22 is below a threshold value, the leakage protection switch 12 is in a first state in which current is able to flow through the leakage protection switch 12. When the difference between the current flowing through the hot conductor 20 and the current flowing through the neutral conductor 22 is above the threshold value, the leakage protection switch 12 enters a second state in which current cannot flow through the leakage protection switch 12. The leakage protection switch 12 can include a differential current transformer. In response to the differential in currents being above the threshold value, the leakage protection switch 12 opens its contacts to prevent current from entering the remainder of the leakage protection circuit 10.

The threshold value can be any appropriate difference between the current in the hot conductor 20 and the neutral conductor 22. In one embodiment, the threshold value is between 4 mA and 6 mA. In another embodiment, the threshold value is between 5 mA and 30 mA.

The leakage protection switch 12 is connected to the control circuit 14 via a hot connector 21 and a neutral connector 23. When the leakage protection switch 12 is in the first state, the current in the hot conductor 20 flows to the control circuit 14 via the hot connector 21. In one embodiment, a fuse 24 is connected to the hot connector 21 to prevent excessive current from entering the control circuit 14 and/or the light board 16. The control circuit 14 is configured to convert the power supplied by the power supply 18 into a form that is appropriate for driving the light. For example, if a DC power supply is used, a linear driving circuit consisting of one or more resistors or a linear regulator can be used to provide an input to the light at the appropriate voltage level. The control circuit 14 can also include an integrated circuit configured for the application. Alternatively, the control circuit 14 can be used to convert an AC power supply into a DC supply that is usable by an LED light. A hot line 26 and neutral line 28 couple the control circuit 14 and the light board 16. As a result, power is supplied to the light in a controlled manner that is appropriate for powering the light. The light board 16 can be a printed circuit board (PCB) or other component which can accept the input from the control circuit 14 and operate the light.

Figure 2:
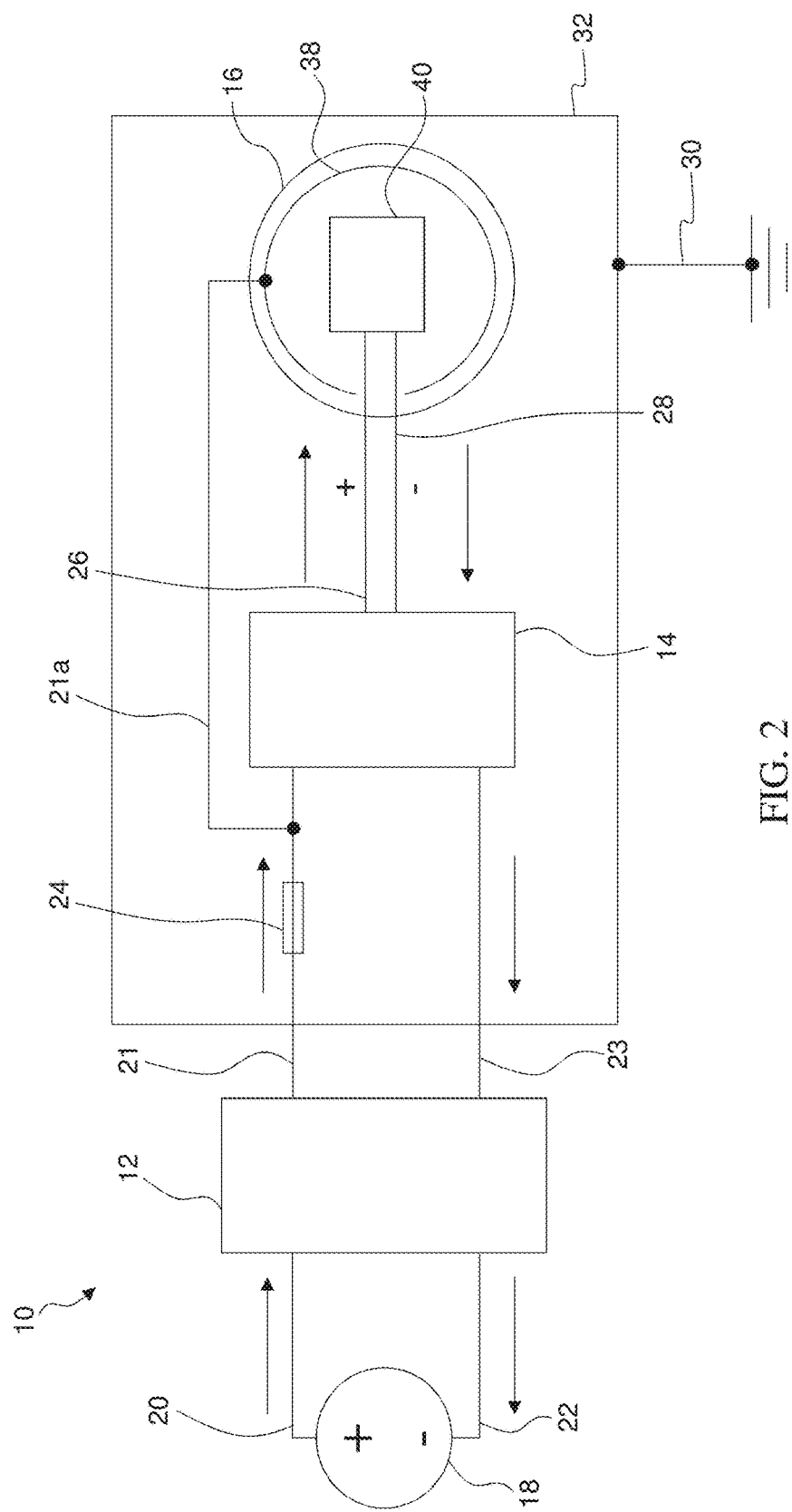
FIG. 2 is a diagram of the leakage protection circuit of FIG. 1 showing the flow of current through the circuit during normal operation.
Figure 3:
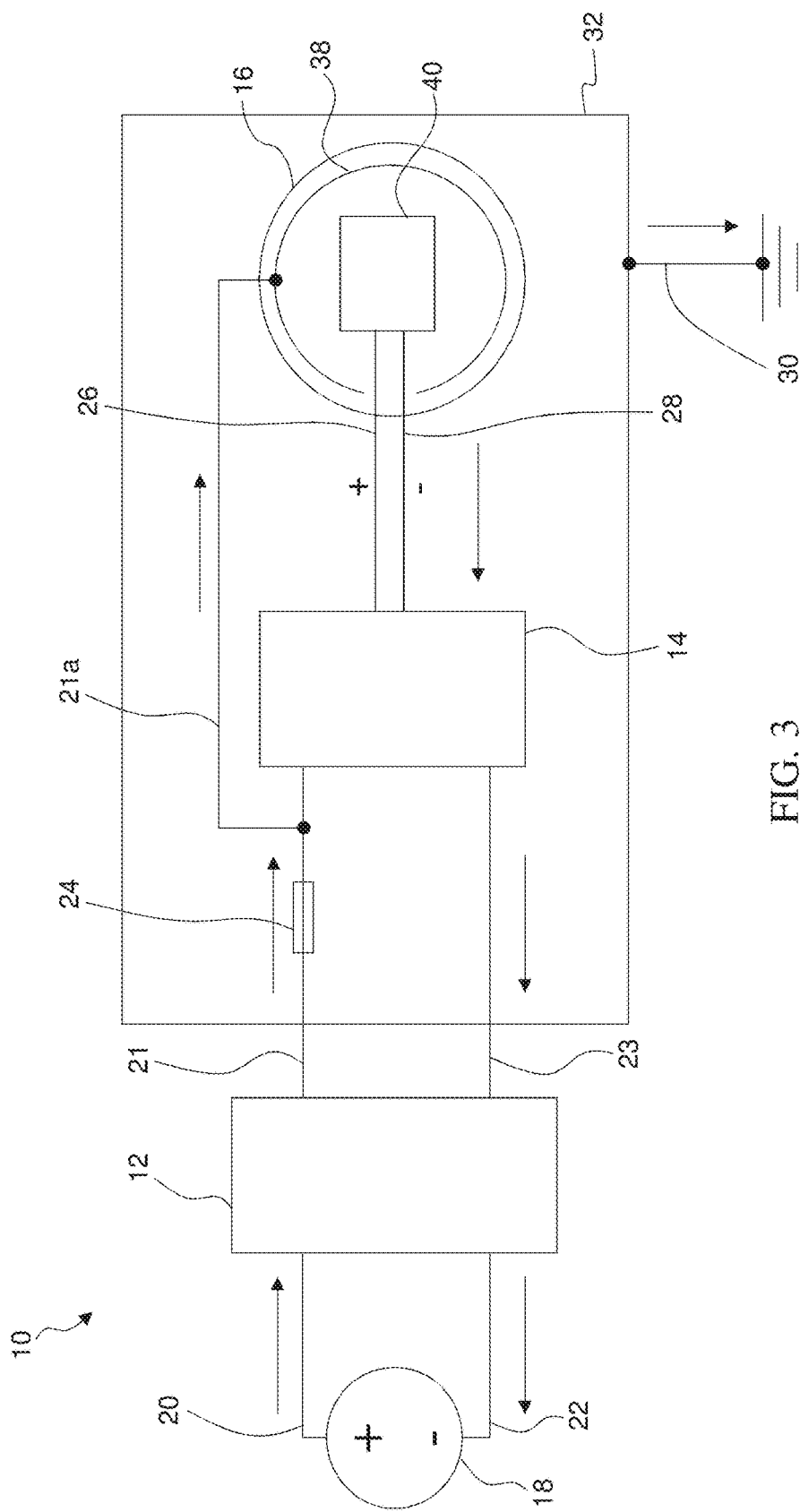
FIG. 3 is a diagram of the leakage protection circuit of FIG. 1 showing the flow of current through the circuit after water enters the light enclosure.

In addition, a branch 21a of the hot connector 21 is connected directly to the light board 16. Further, a ground conductor 30 is connected to a housing 50 within which the LED lamp 34 is installed (shown in FIG. 5). The ground conductor 30 provides a safe path for current to flow in the event of a fault. Connecting the branch 21a of the hot connector 21 directly to the light board 16 (i.e., bypassing the control circuit 14) ensures that, in the event of water entry into the enclosure 32, sufficient current flows through the ground conductor 30 to create a difference of current in the hot conductor 20 and the neutral conductor 22 that is above the threshold. In one embodiment, the light board 16 is a PCB and the branch 21a of the hot connector 21 is coupled to a track (or trace) 38 of the light board 16. As shown in FIGS. 1-3 as well as FIGS. 4 and 6, the track 38 surrounds a light module 40 of the light board 16. The track 38 can be exposed (i.e., it is uncovered or unprotected by any material) along substantially or all of its entire length. This ensures that any water entering the housing 50 and the enclosure 32 will contact the track 38 prior to making contact with the light module 40. In this way, an electrical path is established through the branch 21a to the ground conductor 30, thereby creating a differential in current flow through the leakage protection switch 10 and terminating the flow of current to the light module 40. The track 38 can also be partially exposed along a portion of, substantially or all of its entire length. Portions of the track 38 can be in the form of a circle or semi-circle around the perimeter of the light board 16, as shown. In other embodiments, the track 38 is in the form of a triangle, quadrilateral, a polygon of any number of sides, or any other appropriate shape.

Figure 4:
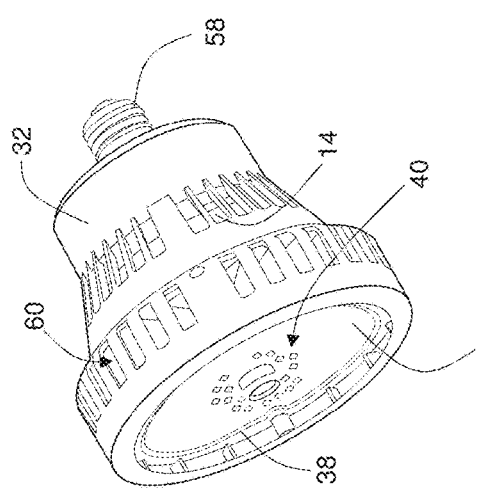
FIG. 4 shows an exploded view of an LED lamp, according to one embodiment.

In one embodiment, the enclosure 32 is cylindrical, conical, or frustoconical such that cross-sections of the enclosure 32 are circular. In such embodiments, the light board 16 can also be circular to fit within the enclosure 32 (as shown in FIG. 4). Hence, the track 38 can be positioned just within the wall of the enclosure 32, thereby ensuring that water contacts at least a portion of the track 38 before contacting the light module 40. The leakage protection switch 12 is triggered whether the water contacts the entire track 38 or only a portion thereof.

The hot line 26 and the neutral line 28 are coupled to the light module 40. The light module 40 includes the bulbs and/or the electrical components for operating or controlling the bulbs. For example, the light module 40 can include one or more LEDs, resistors, capacitors, transistors, and any other appropriate electronic components.

The light enclosure 32 and/or housing 50 (see FIG. 5) are configured to prevent water from entering the enclosure 32 and contacting the electronic components enclosed therein. FIG. 2 shows the flow of current in such normal conditions. As can be seen in FIG. 2, the current flows, via the hot conductor 20, through the leakage protection switch 12. The current then flows through the fuse 24, and to the control circuit 14 via the hot connector 21. Current then flows through hot line 26 to the light board 16 and light module 40. Current then returns via the neutral line 28, the neutral connector 23, and the neutral conductor 22, through the control circuit 14, the leakage protection switch 12, and returns to the power supply 18. In such a normal condition, the current flowing through the hot conductor 20 and the neutral conductor 22 is substantially equal and the difference is below the threshold value.

FIG. 3 shows the flow of current in the event that water enters into the light enclosure 32. Because the water acts as a conductor, current is able to flow from the branch 21a of the hot connector 21 to the ground conductor 30. As a result, less than all of the current returns through the neutral conductor 22. Thus, there is a difference between the current flowing through the hot conductor 20 and the neutral conductor 22 at the leakage protection switch 12. This causes the leakage protection switch 12 to enter the second state in which it prevents current from flowing to the control circuit 14 and the light board 16. This prevents electricity from entering the water and reduces the risk of electrocution for those in the water.

After entering the second state, the leakage protection switch 12 remains in this state to prevent current from flowing into the water. After inspection and repair of the light, enclosure 32, and/or housing 50, the leakage protection switch 12 can be reset to the first state to allow normal operation.

Figure 6:
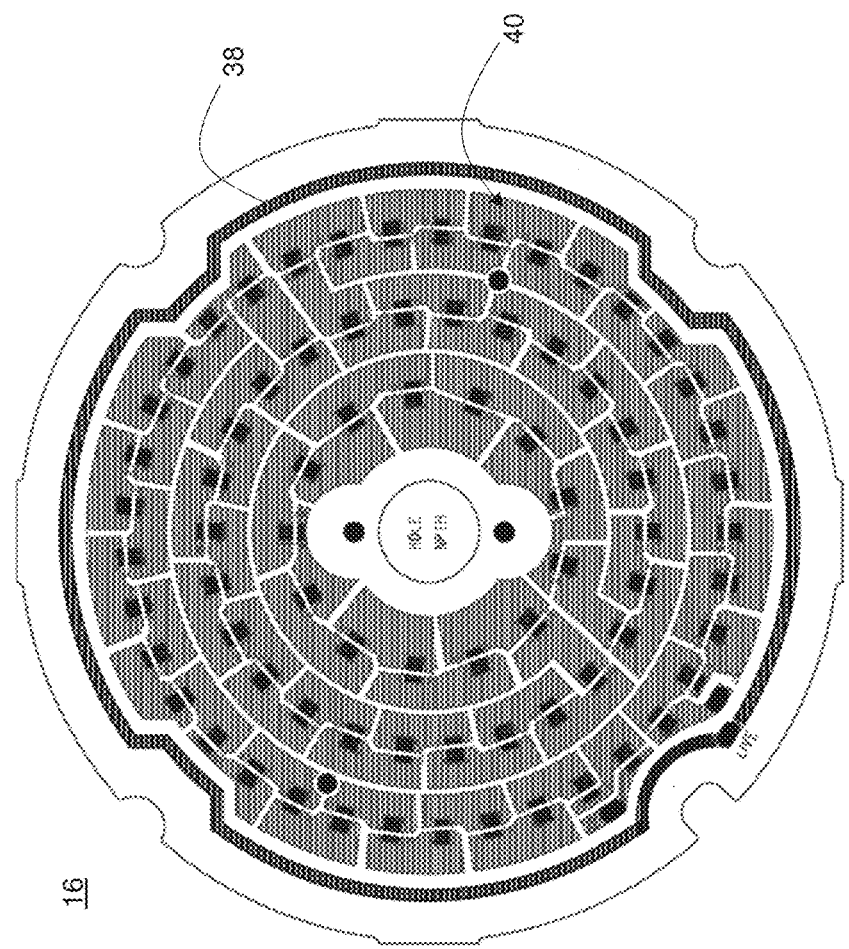
FIG. 6 shows a light board according to one embodiment.

FIG. 4 shows an LED lamp 34 implementing the leakage protection circuit 10 described above. The LED lamp 34 includes one or more light emitting diodes on the light board 16. The light board 16 can also include any other appropriate electrical components. The control circuit 14 is within the light enclosure 32. As can be seen in FIGS. 4 and 6, the track 38 surrounds the light module 40. The track 38 can also be next to the perimeter of the light board 16 or be located in an area in between the perimeter of the light board 16 and the perimeter of the light module 40. Optionally, the LED lamp 34 can further include a lens 42 that fits over the end of the light enclosure 32. The lens 42 can connect to the light enclosure 32 in any appropriate manner including threads, snap-fit, bonding, or any other appropriate method. The lens 42 can be permanently or removably attached to the light enclosure 32. The light enclosure 32 can include one or more vent holes 60 to allow air to flow into the enclosure 32 to maintain the temperature within the light enclosure 32.

Figure 5:
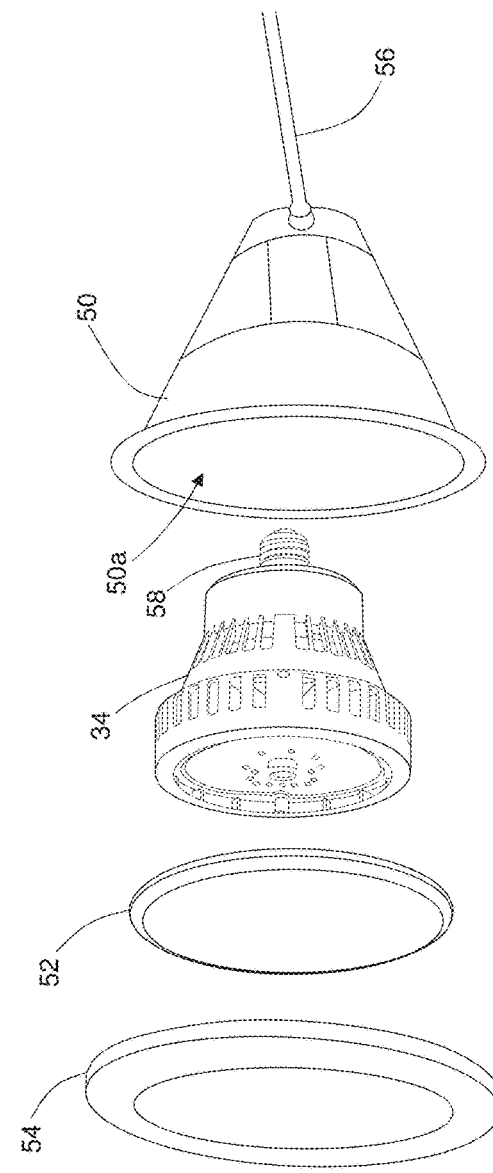
FIG. 5 shows an exploded view of a pool light including the LED lamp of FIG. 4.

As described above, the LED lamp 34 is configured to be installed in environments in which the LED lamp 34 may be exposed to water. For example, the LED lamp 34 can be installed in the sidewall of a swimming pool to provide illumination of the pool and allow nighttime swimming. As shown in FIG. 5, in one embodiment, the LED lamp 34 is installed in a housing 50, which can be conical or frustoconical in shape. The housing 50 can be constructed of any appropriate material. For example, in one embodiment, the housing 50 is constructed of a conductive material such as a metallic material. After installation of the LED lamp 34, a cover 52 is then placed over the open end 50a of the housing 50 and a ring 54 secures the cover 52 to the housing 50. The housing 50 can be installed in a wall and/or floor of a pool. An input line 56 containing the hot connector 21 and the neutral connector 23 is connected to the housing 50 to provide electricity to the LED lamp 34. The LED lamp 34 can include a socket end 58 that can be screwed into the housing 50 to provide an electrical connection to the input line 56. The socket end 58 can be, for example, an E26 screw socket. The ground conductor 30 can be connected to the housing 50 within input line 56 or, alternatively, the ground conductor 30 can be connected to the housing 50 independently of input line 56.

The housing 50 can be installed horizontally in the sidewall of a pool. In such an installation, in the event of a leak in the housing 50, the cover 52, or the connection therebetween, water will rise until it contacts at least a portion of the track 38 on the light board 16. This will allow current to flow from the hot connector 21a to the ground conductor 30, as described above.

In at least one embodiment, a plurality of LED lamps 34 are installed. In such an embodiment, the plurality of LED lamps 34 can each have a leakage protection switch 12. Alternatively, the plurality of LED lamps 34 can share a single leakage protection switch 12, each of the LED lamps being connected to the leakage protection switch 12 via a hot connector and a neutral connector.

In another embodiment, a method of controlling electricity flow to the LED lamp 34 is provided. The method includes providing a current leakage protection circuit 10 having a leakage protection switch 12, an LED lamp 34, and a ground conductor 30. The LED lamp 34 includes a control circuit 14, a light board 16, and an enclosure 32. The control circuit 14 is coupled to the leakage protection switch 12 by a hot connector 21 and a neutral connector 23. The light board 16 is coupled to the control circuit 14 by a hot line 26 and a neutral line 28. A branch 21a of the hot connector 21 is directly coupled to the light board 16. The enclosure supports the control circuit 14 and the light board 16. The LED lamp 34 is disposed in a housing 50 such that the LED lamp 34 is connected to a socket in the housing 50. The ground conductor 30 is coupled to the housing 50. The method also includes powering the LED lamp 34 using a power supply 18 having a hot conductor 20 and a neutral conductor 22 each coupled to the leakage protection switch 12. The leakage protection switch 12 is configured to be in a first state in which the hot conductor 20 and the hot connector 21 are electrically connected or in a second state in which the hot conductor 20 and the hot connector 21 are electrically disconnected. The leakage protection switch 12 enters the second state when the difference between a current flowing through the hot conductor 20 and a current flowing through the neutral conductor 22 exceeds a threshold. The method further includes electrically disconnecting the LED lamp 34 from the power supply by contacting water to at least a portion of the light board 16, and allowing at least a portion of a current flowing through the hot connector 21 to enter the ground conductor 30.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An LED lamp configured to be connected to a leakage protection switch, the LED lamp comprising:
   one or more light emitting diodes;
   a control circuit configured to be coupled to the leakage protection switch by a hot connector and a neutral connector;
   a light board, wherein the light board is a printed circuit board that includes a track that surrounds at least a portion of a light module on the printed circuit board, a branch of the hot connector is directly coupled to the track and the light module is coupled to the control circuit by a hot line and a neutral line; and
   an enclosure supporting the control circuit and the light board;
   wherein when water contacts at least a portion of the track, at least a portion of a current flowing through the hot connector enters a ground conductor, thereby causing the leakage protection switch to electrically disconnect the LED lamp from a power supply.

2. The LED lamp of claim 1, wherein the track is adjacent to at least a portion of a perimeter of the printed circuit board.

3. The LED lamp of claim 2, wherein the track extends adjacent an entire perimeter of the printed circuit board.

4. The LED lamp of claim 3, wherein a substantial length of the track is exposed.

5. The LED lamp of claim 1, further comprising a fuse connected to the hot connector.

6. The LED lamp of claim 1, wherein the LED lamp is configured to be installed in or near a pool or other body of water.

7. A lighting system configured to be powered by a power supply, the lighting system comprising:
   a leakage protection switch coupled to the power supply, and
   a plurality of LED lamps, each LED lamp having:
      one or more light emitting diodes;
      a control circuit configured to be coupled to the leakage protection switch by a hot connector and a neutral connector;

a light board, wherein the light board is a printed circuit board that includes a track that surrounds at least a portion of a light module on the printed circuit board, a branch of the hot connector is directly coupled to the track and the light module is coupled to the control circuit by a hot line and a neutral line; and an enclosure supporting the one or more light emitting diodes, the light board, and the control circuit;

a plurality of housings, each of the plurality of LED lamps being disposed in one of the plurality of housings such that the LED lamp is connected to a socket in the housing; and a ground conductor coupled to each of the plurality of housings;

wherein when water contacts the track of one of the plurality of LED lamps, at least a portion of a current flowing through the hot connector enters the ground conductor, thereby causing the leakage protection switch to electrically disconnect at least one of the plurality of LED lamps from the power supply.

8. The lighting system of claim 7, wherein the track is adjacent to at least a portion of a perimeter of the printed circuit board of each of the LED lamps.

9. The lighting system of claim 8, wherein the track extends adjacent an entire perimeter of the printed circuit board.

10. The lighting system of claim 9, wherein a substantial length of the track is exposed.

11. The lighting system of claim 7, wherein each of the plurality of LED lamps further comprises a fuse connected to the hot connector.

12. The lighting system of claim 7, wherein each of the plurality of LED lamps is configured to be installed in or near a pool or other body of water.

13. The lighting system of claim 7, wherein the leakage protection switch electrically disconnects the plurality of LED lamps from the power supply.

14. A current leakage protection circuit configured to be connected to a power supply, the current leakage protection circuit comprising:
　a leakage protection switch,
　a lamp comprising:
　　a control circuit coupled to the leakage protection switch by a hot connector and a neutral connector;
　　a light board coupled to the control circuit by a hot line and a neutral line and directly coupled to the leakage protection switch by a branch of the hot connector; and
　　an enclosure supporting the control circuit and the light board;
　　wherein the lamp is disposed in a housing such that the lamp is connected to a socket in the housing; and
　a ground conductor coupled to the housing;

wherein when water contacts the light board, at least a portion of a current flowing through the hot connector enters the ground conductor, thereby causing the leakage protection switch to electrically disconnect the lamp from the power supply.

15. The current leakage protection circuit of claim 14, further comprising a fuse connected to the hot connector.

16. The current leakage protection circuit of claim 14, wherein the lamp includes one or more light emitting diodes.

17. The current leakage protection circuit of claim 14, wherein the lamp is configured to be installed in or near a pool or other body of water.

18. The current leakage protection circuit of claim 14, wherein the light board is a printed circuit board that includes a track that surrounds at least a portion of a light module on the printed circuit board, the branch of the hot connector is directly coupled to the track and the hot line and the neutral line are coupled to the light module.

19. The current leakage protection circuit of claim 18, wherein a substantial length of the track is exposed.

20. A method of controlling electricity flow to an LED lamp, the method comprising:
　providing a current leakage protection circuit comprising:
　　a leakage protection switch,
　　the LED lamp comprising:
　　　a control circuit coupled to the leakage protection switch by a hot connector and a neutral connector,
　　　a light board coupled to the control circuit by a hot line and a neutral line and directly coupled to the leakage protection switch by a branch of the hot connector, and
　　　an enclosure supporting the control circuit and the light board;
　　　wherein the LED lamp is disposed in a housing such that the LED lamp is connected to a socket in the housing; and
　　a ground conductor coupled to the housing,
　powering the LED lamp using a power supply having a hot conductor and a neutral conductor each coupled to the leakage protection switch; and
　electrically disconnecting the LED lamp from the power supply by contacting water to at least a portion of the light board, and allowing at least a portion of a current flowing through the hot connector to enter the ground conductor.

21. The method of controlling electricity flow to an LED lamp of claim 20, further comprising triggering the leakage protection switch to electrically disconnect the LED lamp from the power supply.

* * * * *